US008814522B2

(12) United States Patent
Amada et al.

(10) Patent No.: US 8,814,522 B2
(45) Date of Patent: Aug. 26, 2014

(54) CROSS-FLOW FAN IMPELLER FOR A TRANSVERSLEY EXCITED, PULSED, GAS DISCHARGE LASER

(75) Inventors: Yoshiho Amada, San Diego, CA (US); Thomas D. Steiger, San Diego, CA (US); Richard C. Ujazdowski, San Diego, CA (US)

(73) Assignee: Cymer, LLC, San Diego, CA (US)

( * ) Notice: Subject to any disclaimer, the term of this patent is extended or adjusted under 35 U.S.C. 154(b) by 875 days.

(21) Appl. No.: 11/818,829

(22) Filed: Jun. 15, 2007

(65) Prior Publication Data

US 2008/0310960 A1 Dec. 18, 2008

(51) Int. Cl.
*H01S 3/22* (2006.01)

(52) U.S. Cl.
USPC .................................. 416/200 R; 416/198 R (58) Field of Classification Search
USPC ............... 415/53.1, 53.2, 53.3, 119; 416/178, 416/184, 198 R, 200 R
See application file for complete search history.

(56) References Cited

U.S. PATENT DOCUMENTS

| | | | | |
|---|---|---|---|---|
| 4,002,109 A * | 1/1977 | Hori et al. | | 454/235 |
| 4,538,963 A * | 9/1985 | Sugio et al. | | 416/203 |
| 5,064,346 A * | 11/1991 | Atarashi et al. | | 416/178 |
| 5,314,310 A * | 5/1994 | Bachellier | | 416/201 A |
| 5,771,258 A * | 6/1998 | Morton et al. | | 372/57 |
| 5,870,420 A * | 2/1999 | Webb | | 372/58 |
| 5,988,979 A * | 11/1999 | Wang | | 416/178 |
| 6,023,486 A * | 2/2000 | Hofmann et al. | | 372/58 |
| 6,034,984 A * | 3/2000 | Hofmann et al. | | 372/58 |
| 6,061,376 A * | 5/2000 | Hofmann et al. | | 372/58 |
| 6,128,323 A * | 10/2000 | Myers et al. | | 372/38.1 |
| 6,144,686 A * | 11/2000 | Hofmann et al. | | 372/58 |
| 6,149,381 A * | 11/2000 | Lee | | 415/53.1 |
| 6,195,378 B1 | 2/2001 | Hofmann | | 372/58 |
| 6,212,211 B1 * | 4/2001 | Azzola et al. | | 372/33 |
| 6,345,951 B1 * | 2/2002 | Choi | | 415/1 |
| 6,514,036 B2 * | 2/2003 | Marshall et al. | | 415/98 |
| 6,765,946 B2 | 7/2004 | Partlo et al. | | 372/58 |
| 6,953,319 B2 * | 10/2005 | Sohn et al. | | 415/119 |
| 7,132,123 B2 * | 11/2006 | Morton et al. | | 427/58 |
| 2001/0050939 A1 * | 12/2001 | Ujazdowski et al. | | 372/58 |
| 2002/0191661 A1 * | 12/2002 | Morton et al. | | 372/55 |
| 2003/0165175 A1 * | 9/2003 | Ujazdowski et al. | | 372/55 |
| 2004/0022292 A1 * | 2/2004 | Morton et al. | | 372/55 |
| 2006/0275127 A1 * | 12/2006 | Borufka et al. | | 416/203 |
| 2008/0101936 A1 * | 5/2008 | Lee et al. | | 416/203 |

FOREIGN PATENT DOCUMENTS

| | | | | |
|---|---|---|---|---|
| JP | S52-53407 | 4/1977 | | 17/4 |
| JP | S61-144294 | 5/1986 | | 17/4 |
| JP | 08-049689 | 2/1996 | | 17/4 |
| JP | 08-200283 | 8/1996 | | 17/4 |

(Continued)

*Primary Examiner* — Edward Look
*Assistant Examiner* — Aaron R Eastman
(74) *Attorney, Agent, or Firm* — Martine Penilla Group, LLP (57) ABSTRACT

A cross-flow fan impeller for circulating gas in a transversely excited, pulsed, gas discharge laser is disclosed and may comprise a plurality of hubs, the hubs spaced apart along the impeller's rotation axis and establishing at least two impeller segments wherein a first segment has an output flow within 80-120% of a second segment and the first and second segment having differing blade pass frequencies. In some embodiments of this aspect, the first segment may have n number of blades the second segment m number of blades, and m≠n. In one embodiment, the impeller may be configured with n=29 and m=23 and in another embodiment, the impeller may be configured with n=23 and m=19. The impeller may be configured wherein n and m are prime numbers.

29 Claims, 5 Drawing Sheets

(56) References Cited

FOREIGN PATENT DOCUMENTS

| | | | | |
|---|---|---|---|---|
| JP | 09-100795 | 4/1997 | .......................... | 17/4 |
| JP | 10-018990 | 1/1998 | .......................... | 17/4 |
| JP | 11-087810 | 3/1999 | .......................... | 3/36 |
| JP | 11-117891 | 4/1999 | .......................... | 17/4 |
| JP | 2000-058944 | 2/2000 | .......................... | 3/3 |
| JP | 2000-077762 | 3/2000 | .......................... | 3/137 |
| JP | 2000-340869 | 12/2000 | .......................... | 3/97 |
| JP | 2001-041004 | 2/2001 | .......................... | 9/4 |
| JP | 2001-050189 | 2/2001 | .......................... | 17/4 |

\* cited by examiner

CROSS-FLOW FAN IMPELLER FOR A TRANSVERSLEY EXCITED, PULSED, GAS DISCHARGE LASER

The present application is related to U.S. Pat. No. 6,023,486, which issued on Feb. 8, 2000, titled SOLDERED FAN ASSEMBLY FOR ELECTRIC DISCHARGE LASER, U.S. Pat. No. 6,034,984, which issued on Mar. 7, 2000, titled TANGENTIAL FAN WITH CUTOFF ASSEMBLY AND VIBRATION CONTROL FOR ELECTRIC DISCHARGE LASER, U.S. Pat. No. 6,061,376, which issued on May 9, 2000, titled TANGENTIAL FAN FOR EXCIMER LASER, U.S. Pat. No. 6,195,378 which issued on Feb. 27, 2001, titled, TWISTED BLADE TANGENTIAL FAN FOR EXCIMER LASER, U.S. Pat. No. 6,144,686 which issued on Nov. 7, 2000, titled TANGENTIAL FAN WITH CUTOFF ASSEMBLY AND VIBRATION CONTROL FOR ELECTRIC DISCHARGE LASER, and U.S. Pat. No. 6,765,946 which issued on Jul. 20, 2004, titled FAN FOR GAS DISCHARGE LASER, the entire contents of each of which are hereby incorporated by reference herein.

FIELD OF THE INVENTION

The present invention relates to pulsed, gas discharge lasers. The present invention is particularly, but not exclusively useful as a cross-flow fan impeller for a transversely excited, pulsed, gas discharge laser.

BACKGROUND OF THE INVENTION

Gas discharge lasers such as excimer lasers are well known light sources useful for integrated circuit lithography. These lasers typically include two elongated discharge electrodes (for example, about 30 cm in length) that are separated by about 5-20 mm to establish a discharge region between the electrodes. A high voltage pulse power source provides high voltage electrical pulses to produce discharges between the electrodes to create a gain region in a laser gas. A laser gas circulation system is generally employed to produce sufficient laser gas flow between the electrodes to remove from the discharge region substantially all of the heated, ionized gas volume and erosion debris particles produced by each discharge prior to the next succeeding discharge. For this purpose, it is typically desirable to establish a gas flow through the discharge region that is relatively uniform along the length of the electrodes. For this reason, cross-flow fans (also referred to in the art as tangential fans) have been used. For example, co-owned U.S. Pat. Nos. 6,023,486, 6,034,984, 6,061,376, 6,195,378, 6,144,686 and 6,765,946 disclose several cross-flow fan designs, each of which is hereby incorporated by reference herein.

Structurally, cross-flow fans include an elongated, somewhat cylindrical, impeller (also sometimes referred to as a squirrel cage rotor) which is rotated about a longitudinal axis by one or more motors. For example, the impeller may include a plurality of annularly shaped hubs that are spaced apart along the rotation axis and oriented orthogonal to (and substantially centered on) the rotation axis. For the impeller, each hub-pair may constitute an impeller segment and a number of blades may be provided connecting the hubs together at or near the periphery of each segment. In this manner, the blades surround a somewhat cylindrical internal impeller volume. In use, the impeller is typically disposed within and rotates relative to a flow guiding structure which establishes an intake side and a discharge side of the impeller. For some arrangements, this flow guiding structure may include one or more so-called flow cutoff members. When the fan impeller is rotated, laser gas is drawn through the blades into the internal cylindrical volume over the entire length of the fan impeller. Inside the impeller, the laser gas flow is diverted and accelerated by a vortex that is created by the rotation of the impeller. The laser gas then exits over the entire length of the impeller on the discharge side.

As the impeller blades pass the director(s), e.g. flow cutoff member, they may adversely affect laser performance in two ways. First, a mechanical vibration may be produced in the cut-off member structure that may be transmitted to the optical components defining the laser cavity. Second, the flow produced by the impeller may not be smooth, but instead, may consist of many small pressure pulses. Some of these pressure pulses may reach the gain volume where they may perturb the gain media's index of refraction. This perturbation, in turn, may result in an undesirable deterioration of one or more laser performance parameters such as spectral bandwidth, divergence, pulse-to-pulse energy stability, etc. In general, laser performance deterioration is more pronounced at discharge repetition rates which corresponding to the impeller's blade pass frequency and its sub-harmonics (each of which is a function of the impeller rotation speed and the number of blades distributed around the impeller's periphery). As used herein, the term "blade pass frequency" and its derivatives means the reciprocal of the time duration between successive passes of a blade by a stationary point during an impeller rotation. Applicant's have found that an impeller with an even number of blades may generate more undesirable sub-harmonics than an impeller with an odd number of blades, and moreover, impellers having a prime number of blades may generate fewer sub-harmonics than impellers having a non-prime number of blades.

With the above considerations in mind, Applicants disclose a cross-flow fan impeller and cross-flow fan system for a gas discharge laser.

SUMMARY OF THE INVENTION

In a first aspect, a cross-flow fan impeller for circulating gas in a transversely excited, pulsed, gas discharge laser is disclosed. For this aspect, the impeller may comprise at least three hubs, the hubs spaced apart along an impeller rotation axis with each pair of adjacent hubs establishing an impeller segment and each segment having a peripheral region. One of the segments may have n number of blades located at the segment's peripheral region and another segment may have m number of blades located at the segment's peripheral region, with m≠n, and each segment may generate a flow speed in a range of 40 to 60 m/s at a fan rotation speed of about 3500 rpm, and in specific cases may generate a flow speed in a range of 45 to 55 m/s at a fan rotation speed of about 3500 rpm. In one embodiment, the impeller may be configured with n=29 and m=23 and in another embodiment, the impeller may be configured with n=23 and m=19.

The impeller may be configured wherein n and m are prime numbers. Each blade may be aligned parallel to the rotation axis or an impeller may be configured wherein one or more blades are aligned nonparallel to the rotation axis. In one implementation, the segment having n number of blades may be adjacent to the segment having m number of blades. In one arrangement the impeller may comprises more than 15 segments. In one setup, blades in each segment may be azimuthally offset from blades in adjacent segments. Each blade may have a length and a curved cross-section normal to it's length.

The blades in each segment may be nonuniformly spaced around the peripheral region. In some arrangements, each hub may be annularly shaped.

In another aspect, a cross-flow fan impeller for circulating gas in a transversely excited, pulsed, gas discharge laser may comprise a plurality of hubs, the hubs spaced apart along the impeller's rotation axis and establishing at least two impeller segments wherein a first segment has an output flow within 80-120% of a second segment and the first and second segment having differing blade pass frequencies, and in specific cases the first segment may have an output flow within 90-110% of the second segment, the first and second segment having differing blade pass frequencies. In some embodiments of this aspect, the first segment may have n number of blades, the second segment m number of blades, with m≠n. In one embodiment, the impeller may be configured with n=29 and m=23 and in another embodiment, the impeller may be configured with n=23 and m=19. The impeller may be configured wherein n and m are prime numbers.

Another aspect is disclosed in which a cross-flow fan system for circulating gas in a transversely excited, pulsed, gas discharge laser may comprise an impeller defining a rotation axis, the impeller comprising a plurality of hubs, the hubs spaced apart along the axis and establishing at least two impeller segments wherein a first segment has an output flow within 80-120% of a second segment and the first and second segment having differing blade pass frequencies, and in specific cases the first segment may have an output flow within 90-110% of the second segment, the first and second segment having differing blade pass frequencies. For this aspect, the fan system may further comprise at least one motor for rotating the impeller about the axis; and a flow guiding structure which establishes an intake side and a discharge side of the impeller. In some embodiments of this aspect, the first segment may have n number of blades the second segment m number of blades, and m≠n. In one embodiment, the impeller may be configured with n=29 and m=23 and in another embodiment, the impeller may be configured with n=23 and m=19. The impeller may be configured wherein n and m are prime numbers.

DETAILED DESCRIPTION OF PREFERRED EMBODIMENTS

Figure 1:
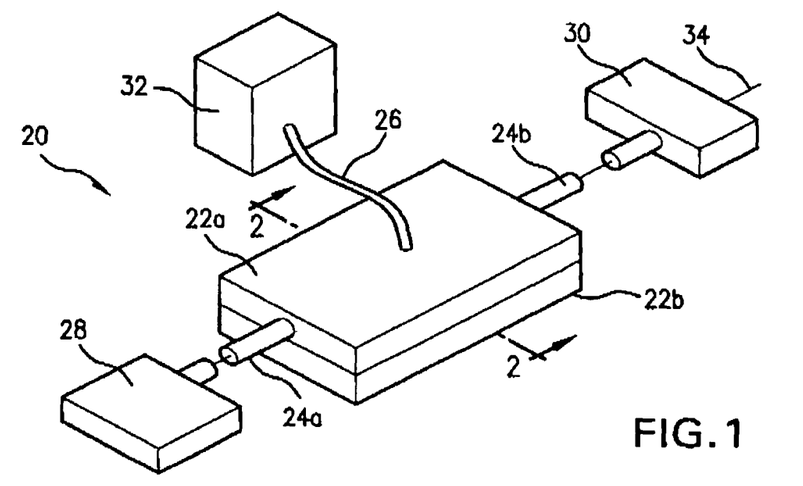
FIG. 1 shows a simplified, perspective, partially exploded view of a transverse discharge gas laser.

Referring initially to FIG. 1, a simplified, partially exploded view of portions of a transverse discharge gas laser device are shown and generally designated 20. For example, the device 20 may be a KrF excimer laser, an XeF excimer laser, an XeCl excimer laser, an ArF excimer laser, a molecular fluorine laser or any other type of transverse discharge gas laser known in the pertinent art. As shown, the device 20 may include a two-part chamber housing 22a,b being formed of a chamber wall that may be made of a conductive, corrosion resistant material, e.g., nickel-plated aluminum. As further shown in FIG. 1, window assemblies 24a,b may be provided at each end of the chamber housing 22a,b to allow light to enter, exit and pass through the chamber housing 22a,b along a common beam path. With this structure, the hollow chamber housing 22a,b and window assemblies 24a,b may surround a volume which holds a gas medium under pressure together with other components suitable to create a discharge in the medium. These other components may include, for example, a pair of discharge electrodes (not shown in FIG. 1), a fan system to circulate the gas (not shown in FIG. 1), heat exchangers to cool the gas (not shown in FIG. 1), etc. It is to be appreciated that the chamber housing 22a,b may also be formed with a number of sealed inlets/outlets (not shown in FIG. 1), to allow gas to be introduced/extracted from the chamber, to allow conductors 26 to deliver an excitation voltage to the electrodes, etc.

In addition to the chamber, FIG. 1 shows that the device 20 may also include a beam reverser 28 and output coupler 30 cooperatively arranged to form an optical cavity. For the device 20, the beam reverser 28 may be as simple as a flat, fully reflective mirror or as complex as a grating-based line-narrowing unit. Continuing with FIG. 1, the device 20 may also include a pulse power system 32 delivering electrical pulses to electrodes located within the chamber housing 22a,b via conductors 26. FIG. 1 further illustrates that during operation of the device 20, a laser beam 34 is created which exits the optical cavity via the output coupler 30.

It is to be appreciated that the use of the fan impeller and fan system described infra is not limited to the stable, standing wave cavity alluded to above, rather, the fan system and fan impeller described herein may be employed within other optical arrangements such as a one-pass amplifier, multi-pass amplifier, traveling wave amplifier such as a ring amplifier, unstable cavities, etc.

Figure 2:
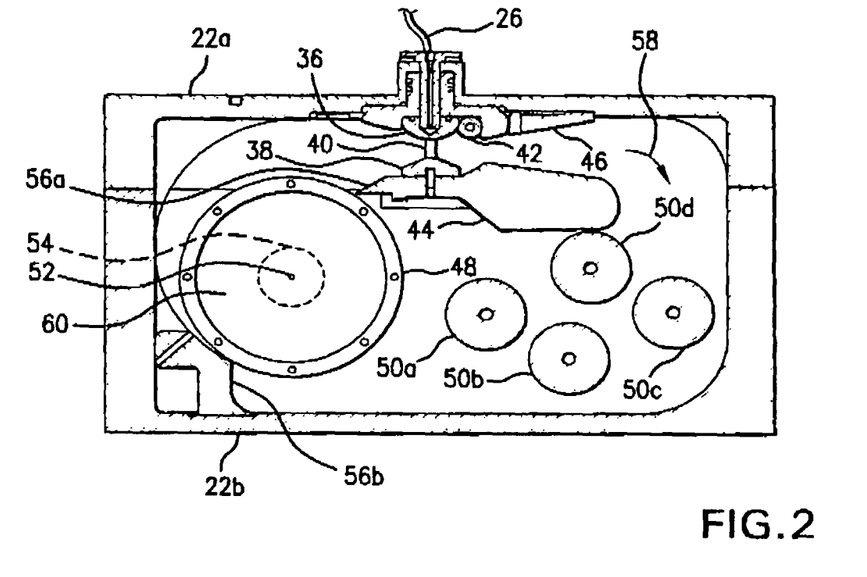
FIG. 2 shows a simplified sectional view of a laser chamber as seen along line 2-2 in FIG. 1.

FIG. 2 shows the inside of the chamber in greater detail. As seen there, chamber components may include chamber housing upper 22a and lower 22b, cathode 36 and anode 38 (which are spaced apart to establish a discharge region 40), preionizer tube 42, anode support flow shaping structure 44, flow shaping structure 46, fan impeller 48, and four water cooled heat exchanger units 50a-d.

Figure 3:
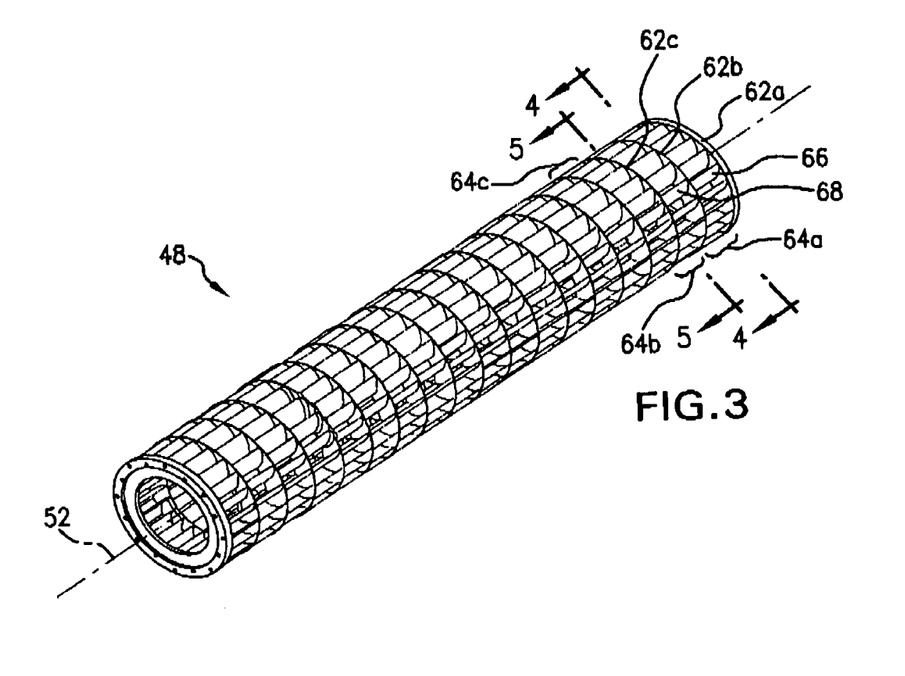
FIG. 3 shows a perspective view of a cross-flow fan impeller having eighteen segments.

Cross referencing FIGS. 2 and 3, is can be seen that the device 20 includes a cross-flow fan system for circulating laser gas through the chamber. As shown, the fan system may include an impeller 48 defining a rotation axis 52, a motor 54 (note: in some cases, two motors may be used with one on each end of the impeller) for rotating the impeller 48 about the axis 52; and a flow guiding structure which establishes an intake side and a discharge side of the impeller 48. For the arrangement shown in FIG. 2, flow guiding structure includes directors 56a,b with director 56a (sometimes referred to as a so-called flow cutoff member) extending from the anode support flow shaping structure 44 to a location proximate the impeller 48 and director 56b attached to the housing wall and extending therefrom to a location proximate the impeller 48, as shown. Typically, each director 56a,b is configured to extend along the length of the impeller 48. With the arrangement shown in FIG. 2, gas from the discharge region 40 flows in the direction of arrow 58 and passes through the heat exchanger units 50a-d where it is drawn into the central volume 60 of the impeller 48. Gas is then discharged from the impeller 48 and directed to the discharge region 40.

As best seen in FIG. 3, the impeller may include a plurality of annularly shaped hubs (of which hubs 62a-c have been identified with reference numerals). Although an impeller 48 with nineteen hubs is shown in FIG. 3, it is to be appreciated that more than nineteen and as few as three hubs may be used. Also shown, the hubs 62a-c may be spaced apart along the axis 52, centered on the axis 52 and oriented orthogonal to (and centered on) the rotation axis 52, with each adjacent hub pair establishing an impeller segment (of which segments 64a-c have been identified with reference numerals). Although an impeller 48 with eighteen segments is shown in FIG. 3, it is to be appreciated that more than eighteen and as few as two segments may be used.

Figure 4:
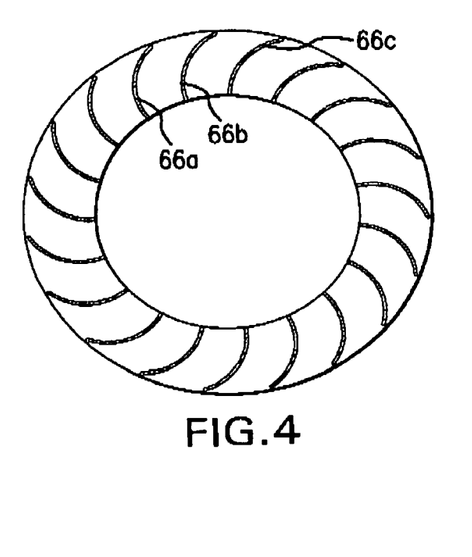
FIG. 4 shows a sectional view of the impeller shown in FIG. 3 as seen along line 4-4 in FIG. 3 showing a segment having 19 blades.

Cross referencing FIGS. 3 and 4, it can be seen that segment 64a may include a plurality of blades 66 (of which blades 66a-c have been identified with reference numerals in FIG. 4) connecting hub 62a to hub 62b at or near the periphery of the segment 64a. As best seen in FIG. 4, segment 64a includes nineteen blades 66, with each blade 66 having a curved cross section normal to the rotation axis 52. Although the blades 66 are shown uniformly distributed around the periphery of the segment in FIG. 4, in other embodiments, the spacing between adjacent blades within a segment may vary around the segment periphery. FIG. 3 also shows that the blades 66 may be relatively straight along their length and aligned substantially parallel with the rotation axis 52.

Figure 5:
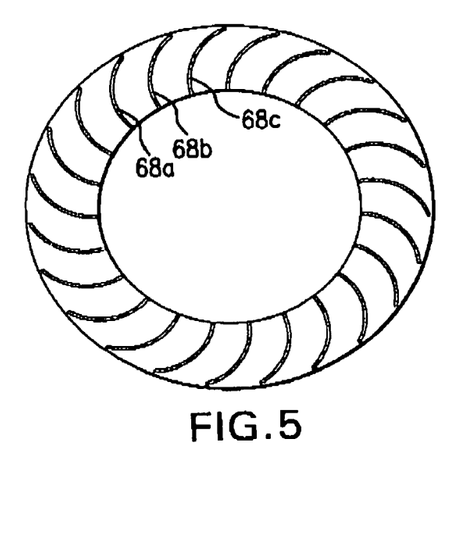
FIG. 5 shows a sectional view of the impeller shown in FIG. 3 as seen along line 5-5 in FIG. 3 showing a segment having 23 blades.

Cross referencing FIGS. 3 and 5, it can be seen that segment 64b may include a plurality of blades 68 (of which blades 68a-c have been identified with reference numerals in FIG. 5) connecting hub 62c to hub 62b at or near the periphery of the segment 64b. As best seen in FIG. 5, segment 64b includes twenty three blades 68, with each blade 68 having a curved cross section normal to the rotation axis 52. Although the blades 68 are shown uniformly distributed around the periphery of the segment in FIG. 5, in other embodiments, the spacing between adjacent blades within a segment may vary around the segment periphery. FIG. 3 also shows that the blades 68 may be relatively straight along their length and aligned substantially parallel with the rotation axis 52.

With the above-described cooperation of structure, it can be seen that adjacent impeller segments may have a different number of blades. Thus, for example, the impeller may be configured having nine segments with nineteen blades and nine segments with twenty-three blades, the dissimilar segments alternating along the length of the impeller. Alternatively, several adjacent segments may have the same number of blades. FIG. 3 also shows that a blade in one segment may be azimuthally offset from a corresponding blade in an adjacent segment.

Figure 6:
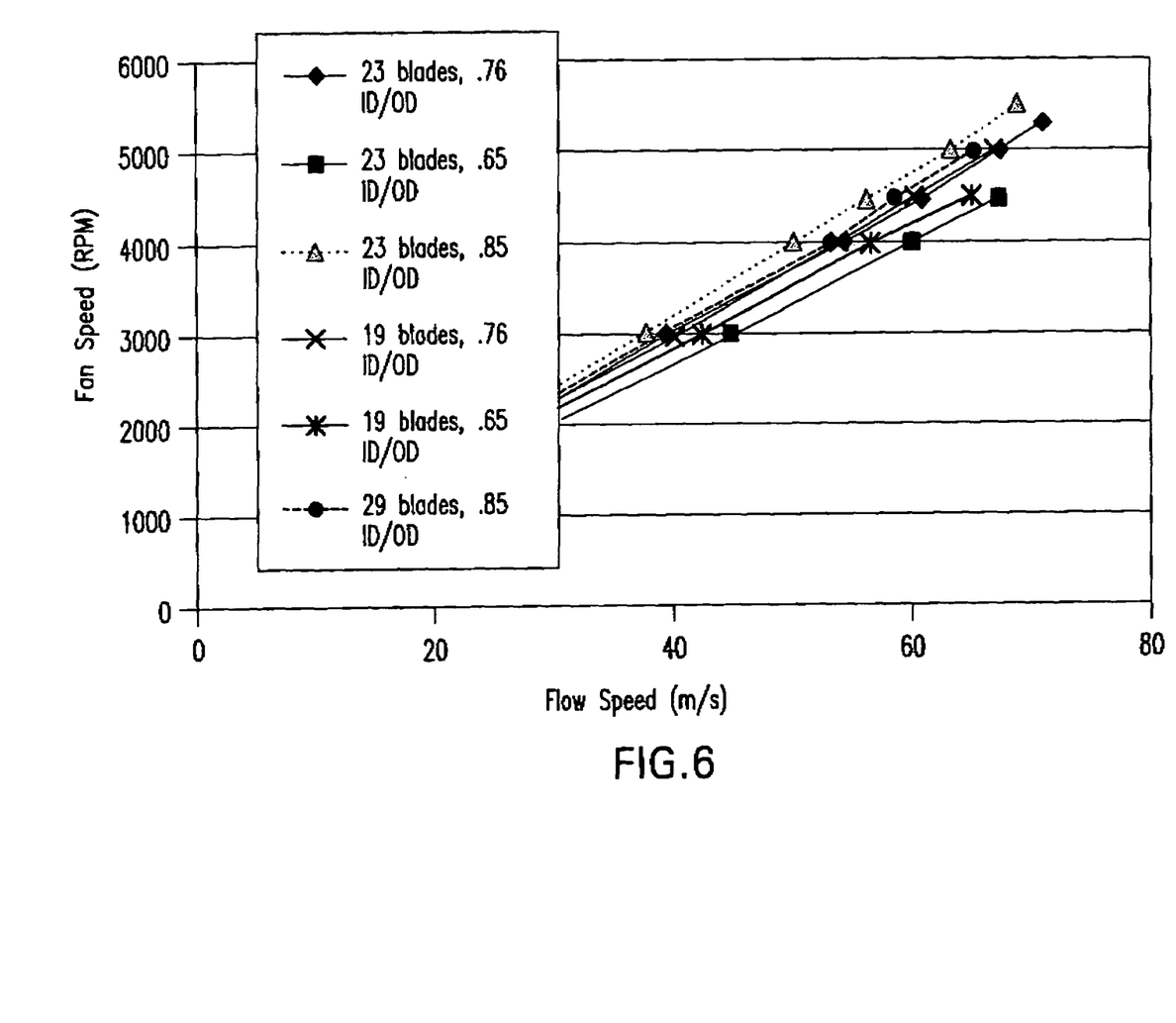
FIG. 6 shows measured flow performances (fan speed in RPM v. flow speed in m/s) for several fan configurations.
Figure 7:
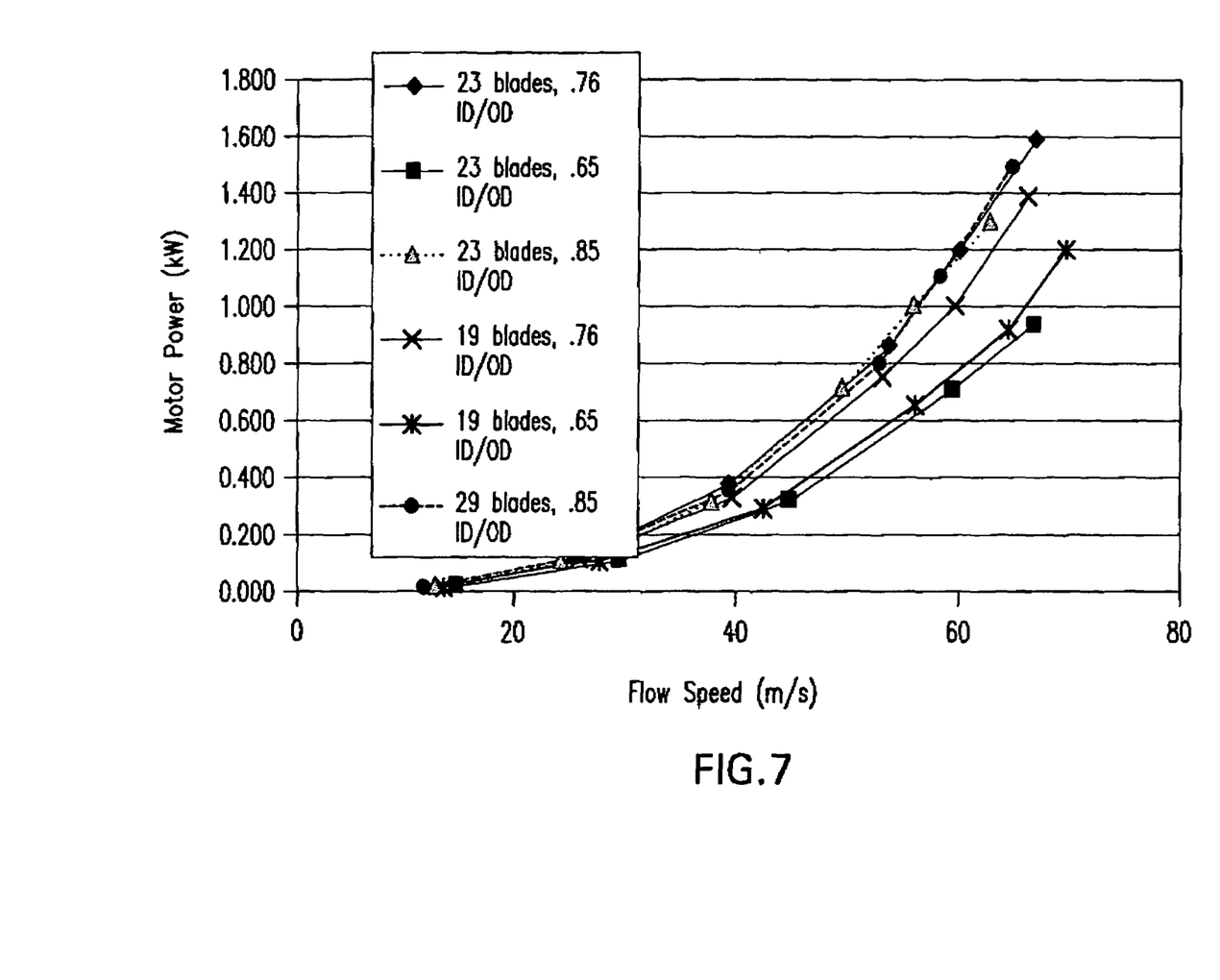
FIG. 7 shows measured flow performances (motor power in kW v. flow speed in m/s) for several fan configurations.
Figure 8:
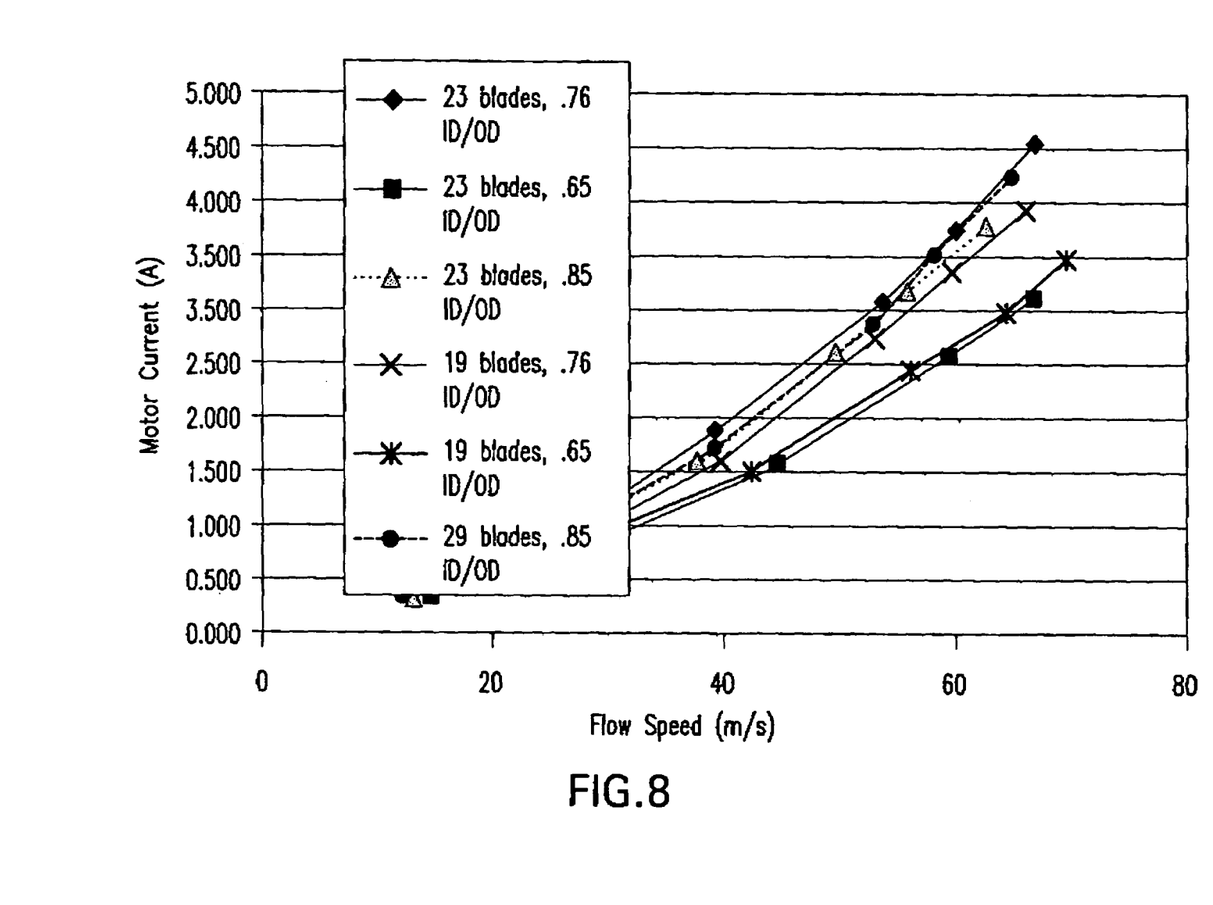
FIG. 8 shows measured flow performances (motor current in A v. flow speed in m/s) for several fan configurations.

FIG. 6 shows measured flow performances (fan speed in RPM v. flow speed in m/s) for fans having 23 blades in all segments and 0.65, 0.76 and 0.85 inside diameter to outside diameter ratio (ID/OD), fans having 19 blades in all segments and 0.65 and 0.76 ID/OD and a fan having 29 blades in all segments and 0.85 ID/OD. FIG. 7 shows measured flow performances (motor power in kW v. flow speed in m/s) for fans having 23 blades in all segments and 0.65, 0.76 and 0.85 ID/OD, fans having 19 blades in all segments and 0.65 and 0.76 ID/OD and a fan having 29 blades in all segments and 0.85 ID/OD. FIG. 8 shows measured flow performances (motor current in A v. flow speed in n/s) for fans having 23 blades in all segments and 0.65, 0.76 and 0.85 ID/OD, fans having 19 blades in all segments and 0.65 and 0.76 ID/OD and a fan having 29 blades in all segments and 0.85 ID/OD.

FIGS. 6-8 illustrate and support the proposition that an impeller having segments with different numbers of blades can be configured having an acceptably uniform flow speed along the length of the impeller.

While the particular aspects of embodiment(s) described and illustrated in this patent application in the detail required to satisfy 35 U.S.C. §112 is fully capable of attaining any above-described purposes for, problems to be solved by or any other reasons for or objects of the aspects of an embodiment(s) above described, it is to be understood by those skilled in the art that it is the presently described aspects of the described embodiment(s) of the present invention are merely exemplary, illustrative and representative of the subject matter which is broadly contemplated by the present invention. The scope of the presently described and claimed aspects of embodiments fully encompasses other embodiments which may now be or may become obvious to those skilled in the art based on the teachings of the Specification. The scope of the present invention is solely and completely limited by only the appended claims and nothing beyond the recitations of the appended claims. Reference to an element in such claims in the singular is not intended to mean nor shall it mean in interpreting such claim element "one and only one" unless explicitly so stated, but rather "one or more". All structural and functional equivalents to any of the elements of the above-described aspects of an embodiment(s) that are known or later come to be known to those of ordinary skill in the art are expressly incorporated herein by reference and are intended to be encompassed by the present claims. Any term used in the specification and/or in the claims and expressly given a meaning in the Specification and/or claims in the present application shall have that meaning, regardless of any dictionary or other commonly used meaning for such a term. It is not intended or necessary for a device or method discussed in the Specification as any aspect of an embodiment to address each and every problem sought to be solved by the aspects of embodiments disclosed in this application, for it to be encompassed by the present claims. No element, component, or method step in the present disclosure is intended to be dedicated to the public regardless of whether the element, component, or method step is explicitly recited in the claims. No claim element in the appended claims is to be construed under the provisions of 35 U.S.C. §112, sixth paragraph, unless the element is expressly recited using the phrase "means for" or, in the case of a method claim, the element is recited as a "step" instead of an "act".

It will be understood by those skilled in the art that the aspects of embodiments of the present invention disclosed above are intended to be preferred embodiments only and not to limit the disclosure of the present invention(s) in any way and particularly not to a specific preferred embodiment alone. Many changes and modification can be made to the disclosed aspects of embodiments of the disclosed invention(s) that will be understood and appreciated by those skilled in the art. The appended claims are intended in scope and meaning to cover not only the disclosed aspects of embodiments of the present invention(s) but also such equivalents and other modifications and changes that would be apparent to those skilled in the art.

What is claimed is:

1. A cross-flow fan impeller for circulating gas in a transversely excited, pulsed, gas discharge laser, said impeller defining a rotation axis and comprising:

at least three hubs, said hubs spaced apart along said axis with each pair of adjacent hubs establishing an impeller segment and each segment having a peripheral region;

wherein a first one of the impeller segments has n number of blades located at the first impeller segment's peripheral region and a second one of the impeller segments has m number of blades located at the second impeller segment's peripheral region, wherein m is not equal to n and each of the first impeller segment includes a first inside diameter and a first outside diameter and a first inside diameter to first outside diameter ratio and the second impeller segment includes a second inside diameter and a second outside diameter and a second inside diameter to second outside diameter ratio and wherein the first inside diameter to first outside diameter ratio is not equal to the second inside diameter to second outside diameter ratio, wherein the first impeller segment and the second impeller segment generates a respective first output flow speed and a respective second output flow speed, wherein the first output flow speed and the second output flow speed are not equal.

2. An impeller as recited in claim 1 wherein n=29 and m=23.

3. An impeller as recited in claim 1 wherein n=23 and m=19.

4. An impeller as recited in claim 1 wherein n and m are prime numbers.

5. An impeller as recited in claim 1 wherein the impeller segment having n number of blades is adjacent to the impeller segment having m number of blades.

6. An impeller as recited in claim 1 wherein blades in each impeller segment are azimuthally offset from blades in adjacent impeller segments.

7. An impeller as recited in claim 1 wherein each blade has a length and each blade has a curved cross-section normal to its length.

8. An impeller as recited in claim 1 wherein the blades in each impeller segment are nonuniformly spaced around the peripheral region.

9. An impeller as recited in claim 1 wherein each hub is annularly shaped.

10. An impeller as recited in claim 1, wherein the first impeller segment and the second impeller segment have an inside diameter to outside diameter ratio of between 0.65 and 0.85.

11. An impeller as recited in claim 1, wherein the respective first output flow speed and second output flow speed in a range of between 40 to 60 m/s.

12. An impeller as recited in claim 1, wherein the fan has a rotation speed of up to about 3500 rpm.

13. An impeller as recited in claim 1, wherein the fan has a rotation speed of up to about 5500 rpm.

14. A cross-flow fan impeller for circulating gas in a transversely excited, pulsed, gas discharge laser, said impeller defining a rotation axis and comprising:
a plurality of hubs, said hubs spaced apart along said axis and establishing at least two impeller segments;
wherein a first impeller segment has a first output flow speed and a second impeller segment has a second output flow speed wherein the first output flow speed is within 80-120% of the second output flow speed and the first impeller segment and the second impeller segment having differing blade pass frequencies; and
wherein the first impeller segment includes a first inside diameter and a first outside diameter and a first inside diameter to first outside diameter ratio and the second impeller segment includes a second inside diameter and a second outside diameter and a second inside diameter to second outside diameter ratio and wherein the first inside diameter to first outside diameter ratio is not equal to the second inside diameter to second outside diameter ratio.

15. An impeller as recited in claim 14 wherein the first impeller segment has n number of blades and the second impeller segment has m number of blades, wherein m is not equal to n.

16. An impeller as recited in claim 15 wherein n=29 and m=23.

17. An impeller as recited in claim 15 wherein n=23 and m=19.

18. An impeller as recited in claim 14 wherein n and m are prime numbers.

19. An impeller as recited in claim 14, wherein the first impeller segment and the second impeller segment generates a respective first output flow speed and second output flow speed in a range of between 40 to 60 m/s.

20. An impeller as recited in claim 14, wherein the fan has a rotation speed of up to about 3500 rpm.

21. An impeller as recited in claim 14, wherein the fan has a rotation speed of up to about 5500 rpm.

22. A cross-flow fan system for circulating gas in a transversely excited, pulsed, gas discharge laser, said fan system comprising:
an impeller defining a rotation axis and comprising a plurality of hubs, said hubs spaced apart along said axis and establishing at least two impeller segments wherein a first impeller segment has a first output flow speed and a second impeller segment has a second output flow speed wherein the first output flow speed is within 80-120% of the second output flow speed and the first impeller segment and the second impeller segment having differing blade pass frequencies;
wherein the first impeller segment includes a first inside diameter and a first outside diameter and a first inside diameter to first outside diameter ratio and the second impeller segment includes a second inside diameter and a second outside diameter and a second inside diameter to second outside diameter ratio and wherein the first inside diameter to first outside diameter ratio is not equal to the second inside diameter to second outside diameter ratio;
at least one motor coupled to the impeller for rotating the impeller about the axis; and
a flow guiding structure which establishes an intake side and a discharge side of the impeller.

23. An impeller as recited in claim 22 wherein the first impeller segment has n number of blades and the second impeller segment has m number of blades, wherein m is not equal to n.

24. An impeller as recited in claim 23 wherein n=29 and m=23.

25. An impeller as recited in claim 23 wherein n=23 and m=19.

26. An impeller as recited in claim 22, wherein the first impeller segment and the second impeller segment have an inside diameter to outside diameter ratio of between 0.65 and 0.85.

27. An impeller as recited in claim 22, wherein the first impeller segment and the second impeller segment generates a respective first output flow speed and second output flow speed in a range of between 40 to 60 m/s.

28. An impeller as recited in claim 22, wherein the fan has a rotation speed of up to about 3500 rpm.

29. An impeller as recited in claim 22, wherein the fan has a rotation speed of up to about 5500 rpm.

* * * * *